(12) United States Patent
Castaño Vega et al.

(10) Patent No.: US 9,487,922 B2
(45) Date of Patent: Nov. 8, 2016

(54) PULLING MACHINE FOR UNLOADING AND LAYING RAILWAY TRACKS

(71) Applicant: FERROVIAL AGROMAN, S.A., Madrid (ES)

(72) Inventors: José Castaño Vega, Madrid (ES); Carlos Menéndez Rodríguez, Madrid (ES); Miguel Ángel Parral López, Madrid (ES); Jorge García Calvo, Madrid (ES); Miguel José Montes García, Madrid (ES)

(73) Assignee: Ferrovial Agroman S. A., Madrid (ES)

( * ) Notice: Subject to any disclaimer, the term of this patent is extended or adjusted under 35 U.S.C. 154(b) by 13 days.

(21) Appl. No.: 14/404,895

(22) PCT Filed: Mar. 20, 2013

(86) PCT No.: PCT/ES2013/070182
§ 371 (c)(1),
(2) Date: Dec. 1, 2014

(87) PCT Pub. No.: WO2013/178845
PCT Pub. Date: Dec. 5, 2013

(65) Prior Publication Data
US 2015/0144020 A1 May 28, 2015

(30) Foreign Application Priority Data

Jun. 1, 2012 (ES) .................................. 201200586

(51) Int. Cl.
*E01B 29/16* (2006.01)
*B25J 15/00* (2006.01)
*E01B 33/02* (2006.01)

(52) U.S. Cl.
CPC ............ *E01B 29/16* (2013.01); *B25J 15/0052* (2013.01); *E01B 33/02* (2013.01); *E01B 2203/16* (2013.01)

(58) Field of Classification Search
CPC .... E01B 29/16; E01B 33/02; E01B 2203/16; B25J 15/0052
See application file for complete search history.

(56) References Cited

U.S. PATENT DOCUMENTS 3,299,833 A * 1/1967 Stewart .................... E01B 29/04
107/7.1
3,381,626 A * 5/1968 Fagan ..................... E01B 27/17
104/12

(Continued)

FOREIGN PATENT DOCUMENTS

DE 29915665 10/2000
EP 2133469 A2 12/2009

(Continued)

*Primary Examiner* — Gerald McClain
(74) *Attorney, Agent, or Firm* — Ladas & Parry LLP

(57) ABSTRACT

The invention relates to a pulling machine for unloading and laying railway tracks, which moves by means of caterpillar tracks running next to the sleepers arranged on the setting bed, with the rail on the provisional supports arranged on the sleepers. The machine comprises a cabin and two caterpillar tracks and includes, in its rear tractor part, a pulling slide that comprises a tube with fastening elements, said tube sliding horizontally, actuated by a hydraulic cylinder comprising a piston connected to the tube, via three dismountable metal supports provided with teflon elements for facilitating the sliding, said metal supports being connected to steel elements acted upon by articulated arms generating the vertical movement by means of the action of another hydraulic cylinder, always maintaining the pulling direction. The machine pulls the rails without needing an auxillary track, maintaining the position of the track-laying train.

5 Claims, 4 Drawing Sheets

(56) References Cited

U.S. PATENT DOCUMENTS

| | | | | |
|---|---|---|---|---|
| 3,424,101 A | * | 1/1969 | Grage | E01B 29/17 104/2 |
| 3,635,164 A | * | 1/1972 | Patton | E01B 29/17 104/2 |
| 4,109,388 A | * | 8/1978 | Stewart | E01B 27/17 104/7.2 |
| 5,704,293 A | * | 1/1998 | Koivisto | E01B 29/02 104/7.1 |
| 8,006,624 B2 | * | 8/2011 | Sin | E01B 29/16 104/2 |
| 9,121,140 B2 | * | 9/2015 | Conner, Jr. | E01B 29/16 |
| 2007/0199472 A1 | * | 8/2007 | Theurer | E01B 29/02 104/7.1 |

FOREIGN PATENT DOCUMENTS

| | | |
|---|---|---|
| ES | 2308954 A1 | 12/2008 |
| ES | 2326541 | 10/2009 |
| GB | 2453754 A | 4/2009 |

* cited by examiner

PULLING MACHINE FOR UNLOADING AND LAYING RAILWAY TRACKS

RELATED APPLICATION INFORMATION

This application is a 371 of International Application PCT/ES2013/070182 filed 20 Mar. 2013, which was published on 5 Dec. 2013, with International Publication Number WO 2013/178845 A1, which claimed priority from ES Application No. 201200586 filed on 1 Jun. 2012, the disclosures of which are incorporated in their entirety by reference herein.

FIELD OF THE INVENTION

This invention refers to a pulling machine for unloading and laying railway track and falls within the railway infrastructure construction and maintenance sector.

PRIOR ART

Rail trains are normally used to carry rails to the area in which the railway tracks are to be laid.

One of the activities that has been studied the most in the process of installing railway track is the unloading of the rails from the rail train.

There are basically two methods for unloading the rails. They differ in that in one of the methods, the rail train advances over track that has already been installed, while the rail remains anchored at one end to a fixed point, and in the other method, the rail train stays in place while the rail is pulled out following the alignment of the track. If the first method is used, previously-installed track is required, which may be a track that will be replaced or an auxiliary track.

With the second method, the rail train remains in a fixed location on the track, which may be the new track that was installed previously, and the new rail that will be positioned as the continuation of the track that has already been installed is pulled out.

The advantage of the latter work method is that it does not require an auxiliary or previously installed track.

Currently, in the case of construction of new railway track, the second method is the one that is more relevant and that is normally chosen in order to achieve higher productivity, because it avoids the installation of auxiliary track.

There is no known machine that is commercially available to carry out these tasks of unloading and laying railway track.

Several proposals are known for machines to unload track, according to document U.S. Pat. No. 3,635,184, which refers to a machine to position rails in pairs.

Utility model ES2308949 describes a machine for unloading and laying on sleepers on railways, which consists of a lightweight self-propelled portal frame from which the rails that will be unloaded and laid are suspended.

There is experience in the use of non-specific machines for these tasks, as in the case of portal frames for positioning turnouts, with the track to be unloaded and positioned anchored to the frames with shackles and cables.

Two short sections of track, one for each rail that will form the track, are hooked to the frame with cables and shackles. These sections, which are kept in the horizontal position, are connected with fishplate clamps to the rails located in the rail train that are to be laid. This machine was not originally designed for this type of work and its size is suitable only for lifting, transporting, and lowering the load. This means that to position turnouts, the frame is subjected to stresses that were not taken into consideration in its original design during the unloading activity, pulling on rails, which results in high maintenance and repair costs for the machine.

The purpose of this invention is therefore to provide a specific machine for carrying out the operation of unloading the rail train, with elements that are specifically and optimally designed and dimensioned for the work. The machine must be able to unload the rails from the rail train and deposit them on the sleepers that were put in place earlier. To do this, it must move over the ballast on the line on which the future track will be placed, and have sufficient power and traction capacity to carry out this work, and a traction system that allows it to move on the platform with the sleepers that were put in place earlier.

SUMMARY OF THE INVENTION

This invention arose from the need for a specific machine for carrying out the work of unloading and laying railway track, which is brought by a rail train, quickly, safely, and precisely.

The existing problem of unloading the rail that forms the continuous track and positioning it on the sleepers with the spacing required by the gauge of the track in question, in the shortest time possible, is resolved satisfactorily by this invention.

One aspect of the invention refers to a pulling machine for unloading and laying railway track, characterised in that it comprises a cab; two caterpillar tracks whose inside edges are spaced apart at least the width of a standard sleeper plus a safety margin of 20 cm on each end of the standard sleeper; a chassis; a front suspension beam and a pivoting axle, with a series of hydraulic conduits running inside to transmit motion, which connect the caterpillar tracks to the chassis, and a pulling slide, which also comprises a commercial galvanized steel tube that can slide on three fixed supports driven by the action of a horizontal hydraulic cylinder, whose axle is connected to the first tab welded to the tube, and whose body is welded to one of the fixed supports; a series of second tabs welded in two groups of three to the tube with a fixed and constant spacing that corresponds to the different track gauges with which the machine can work; in that the clear height above the ground of the front suspension beam and the pivoting axle is at least the sum of the heights of a standard sleeper, a series of temporary supports, and rails; the fixed supports are each welded to steel elements; and the steel elements are welded to a series of jointed arms that can move vertically, driven by the action of a hydraulic cylinder, so that the tube always remains horizontal and parallel to the ground.

This is therefore a machine that has a large pulling capacity, thanks to its system of movement, allowing it to drag long lengths of rail and therefore quickly unload the rail train, without the need for auxiliary track. It also unloads the rails in parallel, maintaining the separation required by the track gauge of the project at all times, with the possibility of adapting to the layout established in the project, and is able to move on the ballast platform with the sleepers previously installed, with neither the sleepers nor the rails that have already been unloaded and positioned posing an obstacle to the machine's movement and operation.

Another aspect of the invention refers to the operational procedure of the pulling machine for unloading and laying railway track, which comprises the following stages:

a) an operator climbs into the cab of the pulling machine, starts the engine of the machine, and starts up the camera system;
b) the pulling machine is positioned on the ballast platform at the starting point of the section of track that is to be laid;
c) an operator standing trackside at the starting point of the section of track that is to be laid hooks each one of the groups of second tabs that take part in the pulling slide of the pulling machine, using shackles and cables; these rails will be on the rail train that brought them;
d) the trackside operator takes a remote control and verifies its functioning with a series of simple raising and lowering operations of the pulling slide and making small lateral movements of the tube;
e) the operator in the cab advances the pulling machine aligning it with the sleepers installed on the ballast platform; and
f) the trackside operator walks close to the back of the pulling machine, which advances at a speed close to walking speed, providing a complete view of the rail-laying process, and controls the movement of the pulling slide with the remote control.

BRIEF DESCRIPTION OF THE DRAWINGS

To complement this description and to provide a better understanding of the characteristics of the invention, the description is accompanied, as an integral part of this description, by four pages of plans, which illustrate but do not limit the characteristics of a pulling tractor for unloading and placement of railway rails, prepared in accordance with the object of this invention, as follows.

DETAILED DESCRIPTION OF THE INVENTION

Figure 1:
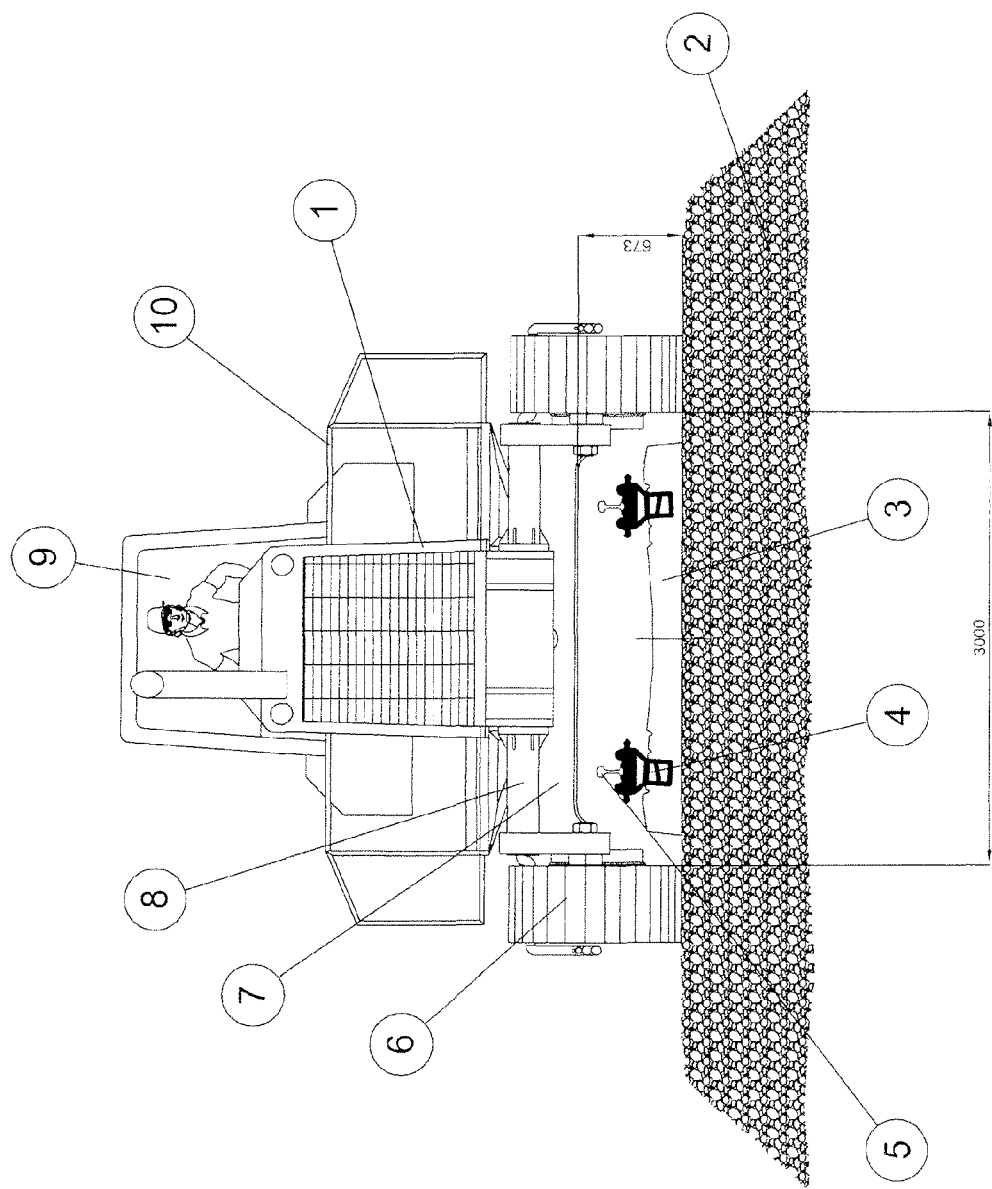
FIG. 1 Shows a schematic representation of a front-view elevation of the pulling machine for unloading and laying railway track.

The machine is basically comprised of two clearly distinct parts: a first part made up of the chassis and drive elements, which allow the machine to move under its own power, and a second part that is made of the elements that allow the rails that must be pulled to unload the rail train that brought them to the worksite to be secured and which also facilitate the positioning of the rails on the sleepers that have been put into place previously.

The positioning of the rails is determined by the layout of the railway track and by the separation between the rails, depending on whether the track is international or Iberian gauge.

The drive part comprises a tractor chassis, its drive elements, a cab, and a series of traction elements.

The arrangement of the caterpillar tracks and their connection to the chassis of the machine is done in such a way that the space between the inside edges of the caterpillar tracks is sufficient to allow them to run beside the previously installed standard sleepers with a safety margin (20 cm on each end) when the machine advances at the operating movement speed. The caterpillar tracks of the machine are connected by a conventional arrangement of a front suspension beam and a hollow pivoting axle, both adapted to the specific geometry that is required by this specific work of unloading and laying rails, in addition to the separation between the caterpillar tracks specified above, the machine requires ample clearance to pass over the sleepers installed previously on the ballast platform, and even above the rails on top of temporary supports that are used to move the rails, because it is common for the pulling machine to have to leave the work zone by driving on the track with the rails already positioned in that temporary position.

The machine is powered by a diesel engine and a central hydraulic unit that transmits the power to the caterpillar tracks through oil lines that are run inside the hollow pivoting axle.

To increase personal safety, the caterpillar tracks are equipped with a protective cowling, which prevents possible projection of the stones that make up the ballast platform at operators or equipment that could be working near the machine.

The part that concerns the system for holding the rails that are being unloaded and positioned on the sleepers is located on the rear of the machine and consists of an element that is called the pulling slide. This pulling slide basically comprises a tube with the capacity to move horizontally by the action of a hydraulic cylinder. This movement is done by sliding on three supports that form part of the machine's chassis. The body of the hydraulic cylinder is located on one of these supports (fixed point), with the shaft connected to the two tabs that are welded to the tube that slides (moving point). The pulling stresses generated by the rail are exerted on this tube and will be transmitted to the machine through the supports. The purpose of this horizontal movement is to adjust the position of the rails to the desired position on the sleepers.

In addition, to adjust the vertical position of the rails, the machine is equipped with a second hydraulic cylinder, which is secured at one end to the machine's chassis, and at the other to the structure of the pulling slide by a series of jointed arms. The position of the hydraulic cylinder that generates the vertical movement and the movement of the joints that allow this movement is designed in such a way that the position of the pulling slide always remains horizontal, parallel to the ground, and facing the rails, with no turning of this tube on its axis.

These two movements, the horizontal and vertical, precisely position the rails, independently from the movement of the machine.

To hold the rails, there are a series of tabs and pins that have been designed so that the shackles, cables, and jaw clamps (commercial elements that fall outside the scope of this patent) can be installed in order to maintain the constant separation between the rails that is used in Spain, Iberian gauge, or international gauge, as the two most common.

All of the movements can be controlled by an operator from the cab. Nevertheless, to increase the precision of the placement of the rails, a work procedure has been defined in which a second operator, located trackside on the ballast platform near the rear of the machine, with a complete view of the rail-laying process, controls the movements of the pulling slide with a radio control that complies with all safety standards, equipped with the necessary interlocking and with the minimum commands to carry out the movements or stop the operations. This radio controller is autonomous and powered by batteries, but has the possibility of drawing power from the pulling machine by connecting a cable from the pulling machine to the radio controller, taking advantage of the fact that the machine's operating speed is similar to walking speed.

Another element for the control of the procedure that has been defined is based on cameras installed on the machine's chassis, which provides the operator located in the cab with detailed information on the position with respect to the sleepers over which the machine is travelling, and what is occurring to the rear of the machine and the track that has already been positioned, allowing the machine to move safely and without the risk of striking the existing sleepers.

As shown in FIG. 1, the pulling machine 1 for unloading and laying railway tracks that is described comprises a cab 9 and two caterpillar tracks 6 that the machine uses to move over the ballast platform 2 and that are separated by sufficient distance to allow the machine to travel over the sleepers that were installed previously. The pulling machine is also has sufficient clearance even to pass over a rail 5 on top of a temporary support 4 used in the unloading process, because the suspension elements (front suspension beam 7) and traction elements (pivoting axle 8) hare designed to create sufficient space to allow this, and because the transmission of movement is done using hydraulic lines that are run inside the pivoting axle 8.

In FIG. 1, the distance between the inside edges is 3 m, with a clear height above the ground (the ballast platform 2) of 673 mm.

Figure 2:
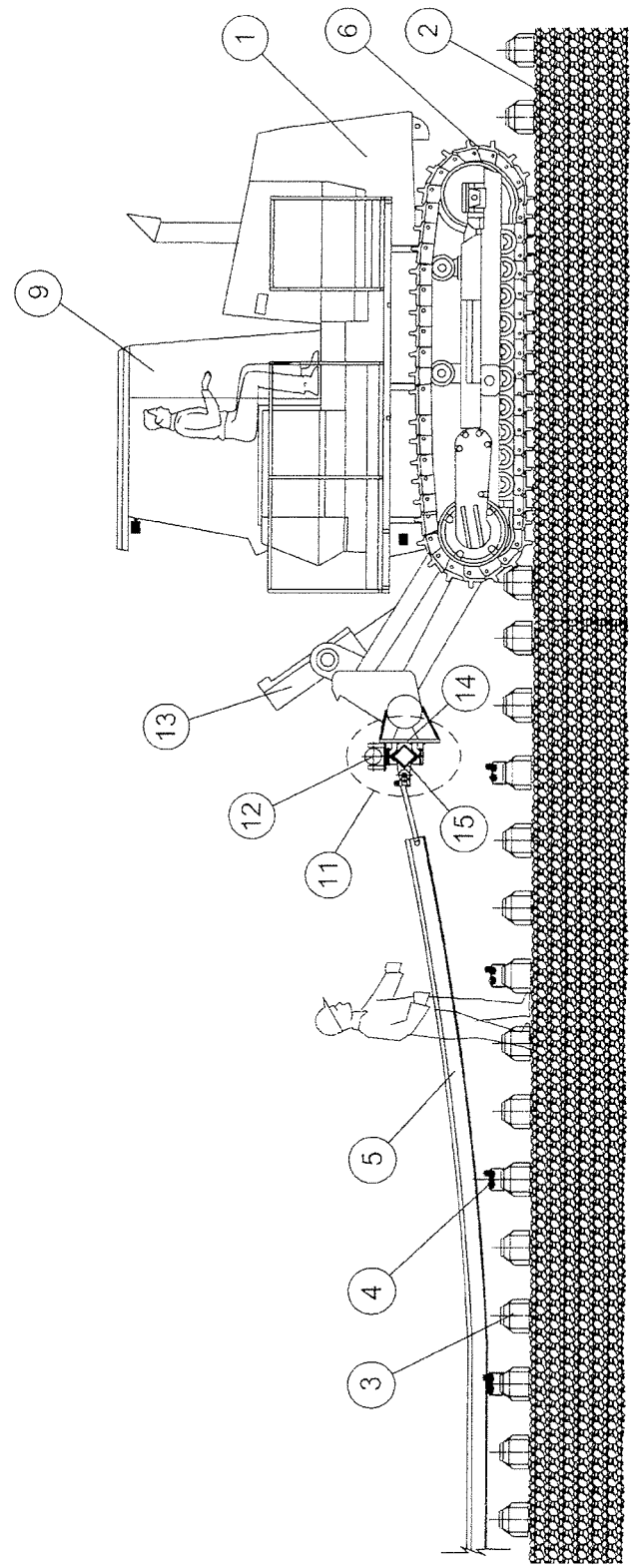
FIG. 2 Shows a schematic representation of a side-view elevation of the pulling machine for unloading and laying railway track, which shows how the rails are connected to the pulling slide, which is located on the rear of the machine.

As shown in FIG. 2, the machine that is described comprises a pulling slide 11 connected to the back of the machine's chassis by the welding of steel plates 14, which use commercial elements such as shackles and cables to connect to the rails 5 that must be unloaded from the rail train that brought them to the worksite and that are positioned on the sleepers 3 or temporary supports 4 that facilitate movement. The hydraulic cylinder 13 provides the vertical movement of the pulling slide, so that the tube 15 that is included in the pulling slide always remains horizontal and parallel to the ground. The transversal movement of the tube 15 is generated by another hydraulic cylinder 12 located on the central support of the pulling slide.

Figure 3:
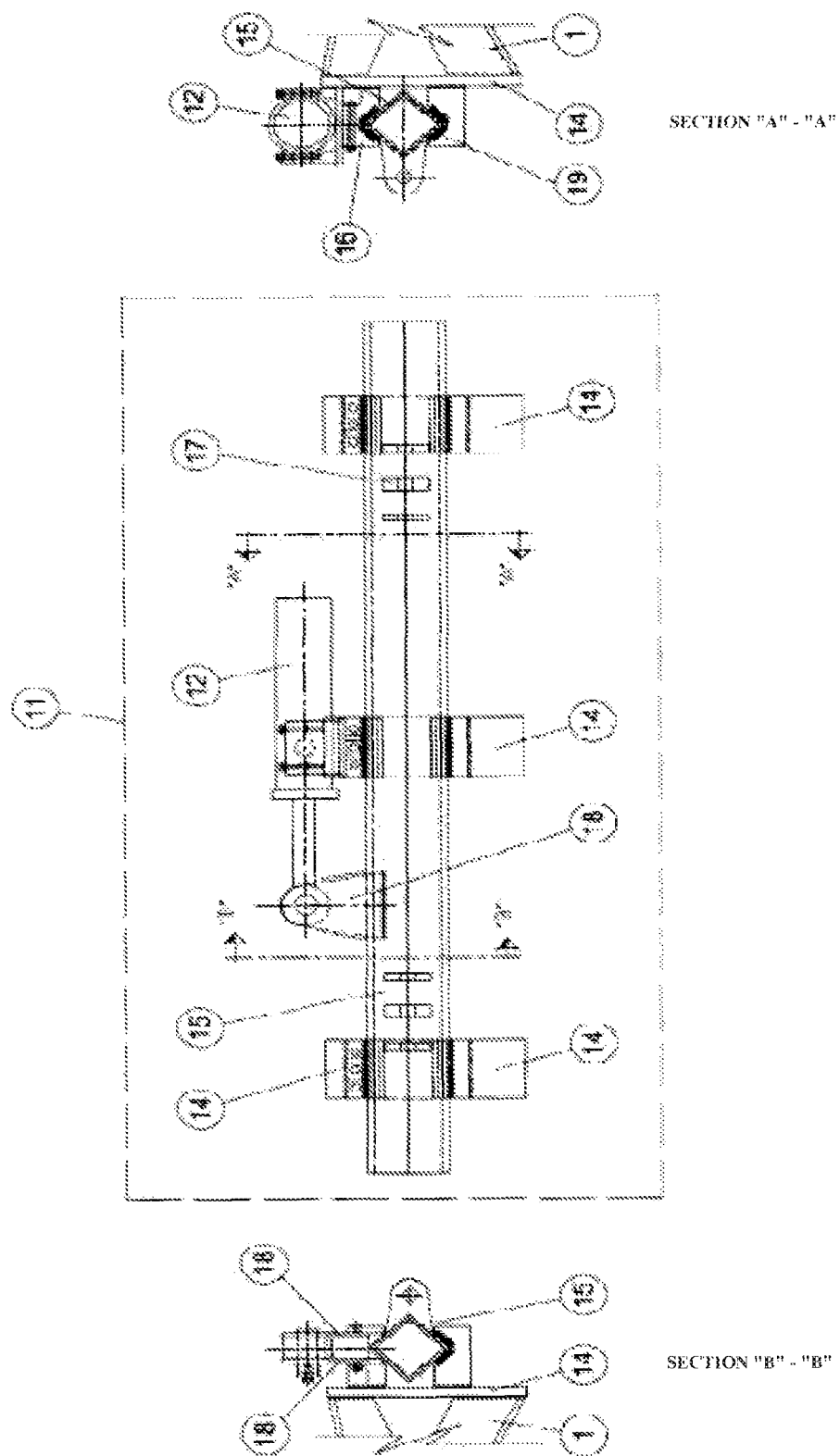
FIG. 3 Shows a representation of the pulling slide and the elements that comprise it.

As shown in FIG. 3, the pulling slide 11 and the elements that comprise it: a commercial tube 15 made of galvanized steel for outdoor use that slides on three fixed supports 16 as a result of the action of a horizontal hydraulic cylinder 12, whose shaft is connected to the first tab 18 that is welded to the tube 15 and its body is welded to one of the fixed supports 16, as well as a series of removable Teflon elements 19 to facilitate sliding that are contained in the fixed supports 16. The fixed supports 18 comprise a series of removable steel elements that allow the removal of the tube 15 and that are each welded to a steel element 14, which are in turn welded to a series of jointed arms that move vertically, always maintaining the direction of the pull longitudinal and in the same direction as the traction due to the action generated by the hydraulic cylinder 13, and, along with the transversal movement generated by the horizontal hydraulic cylinder 12, adjusting the placement of the rails to the layout of the platform, with the rails secured using commercial connection elements such as shackles and cables to the second welded tabs 17, in two groups of three, to the tube 15, and arranged so that the rails 5 are unloaded and positioned on the sleepers 3 with a fixed and constant separation that corresponds to the different track gauges with which the machine can work.

Optionally, the aforementioned arrangement may be complemented with a system of cameras positioned at strategic points on the machine to monitor its advance over the previously installed sleepers 3 and the track placement work, which is executed by a second operator from the ballast platform 2 with a remote control unit 20, in order to provide a direct view of the track that is being positioned. The images from these cameras are viewed by the operator in the cab 9, which is equipped with a display for this purpose.

Figure 4:
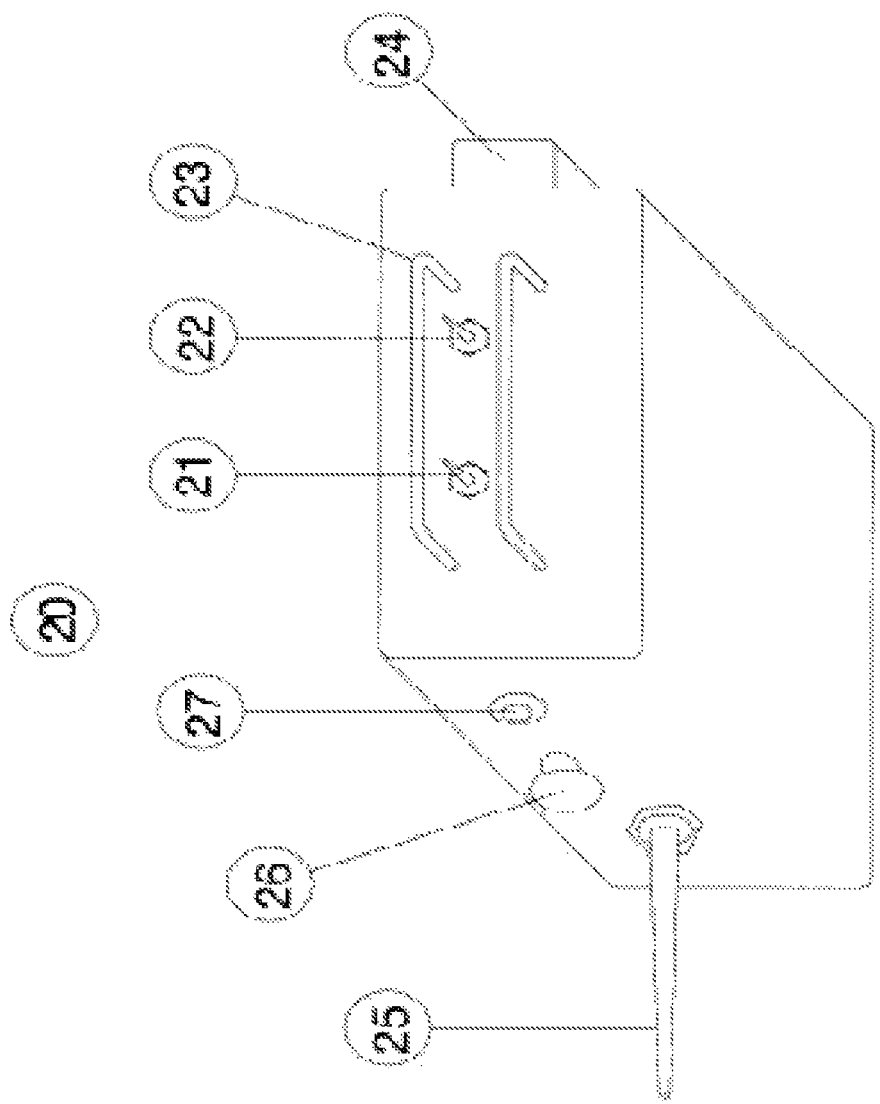
FIG. 4 Shows a schematic representation of radio-control for the remote control of the pulling machine for unloading and laying railway track.

FIG. 4 shows the radio-control unit 20 for the remote control of the pulling machine for unloading and laying railway track, it consists of two joysticks 21-22, one to control horizontal movement and the other for vertical movement of the pulling slide 11. These controllers cannot be pressed accidentally because they are protected by two bars 23. It is also equipped with an emergency stop device 26 and a button 27 for communication with the operator in the cab. To allow the work of the trackside operator, the remote control 20 comprises a battery 24 and an antenna 25, so that the use of cables is not required for electrical power supply or to control the movement. For safety reasons, there is an interlocking between the cab control and the remote control 20.

The stages of the operational procedure of the pulling machine for unloading and laying railway track are described below.

First, an operator climbs into the cab 9 of the pulling machine, starts the engine of the machine, and starts up the camera system.

Second, the pulling machine is positioned on the ballast platform 2 at the starting point of the section of track that is to be laid. The aforementioned caterpillar tracks 8 and the suspension elements 7 and traction elements 8 described previously have sufficient power to ascend platform embankments with slopes of less than 10% and the pulling machine can access the work area under its own power.

Third, an operator standing trackside at the starting point of the section of track that is to be laid hooks each one of the groups of second tabs 17 that take part in the pulling slide 11 of the pulling machine 1, using shackles and cables; these rails 5 will be on the rail train that brought them.

Fourth, the trackside operator takes a remote control 20 and verifies its functioning with a series of simple raising and lowering operations of the pulling slide 11, and making small lateral movements of the tube 15 that comprises the slider.

Fifth, the operator in the cab advances the pulling machine aligning if with the sleepers 3 installed on the ballast platform 2. To verify that the machine is following the correct trajectory, it is equipped with the system of cameras described above.

Sixth, the trackside operator walks close to the back of the pulling machine, which advances at a speed close to walking speed, providing a complete view of the rail-laying process, and controls the movement of the pulling slide 11 with the remote control 20.

The invention claimed is:

1. Pulling machine (1) for unloading and laying railway track characterised in that it comprises:
 a cab (9);
 two caterpillar tracks (6) whose inside edges are spaced apart by at least the width of one standard sleeper (3) plus a safety margin of 20 cm at each end of the standard sleeper (3);

a chassis;

a front suspension beam (7) and pivoting axle (8), with the hydraulic lines that transmit the movement running inside, that connect the caterpillar tracks (6) to the chassis; and a pulling slide (11) that in addition comprises:

- a commercial tube (15) made of galvanized steel that slides on three fixed supports (16) as a result of the action of a horizontal hydraulic cylinder (12), whose shaft is connected to the first tab (18) that is welded to the tube (15) and its body is welded to one of the fixed supports (16);
- a series of removable Teflon elements (19) that are contained in the fixed supports (16);
- a series of second tabs (17), in two groups of three, welded to the tube (15) with a fixed and constant separation that corresponds to the different track gauges with which the machine can work;
- in which the clear height above the ground of the front suspension beam (7) and the pivoting axle (8) is at least the sum of the heights of the standard sleeper (3), temporary supports (4) and the rails (5);
- the fixed supports (16) are each welded to a steel element (14); and
- the steel elements (14) are welded to a series of jointed arms that are moved vertically by the action of a hydraulic cylinder (13) in such a way that the tube (15) always remains horizontal and parallel to the ground.

2. Pulling machine (1) for unloading and laying railway track, according to claim 1, which in addition comprises a set of cameras located on the chassis.

3. Pulling machine (1) for unloading and laying railway track, according to claim 1 in which the caterpillar tracks (6) comprise a protective cowling.

4. Pulling machine (1) for unloading and laying railway track, according to claim 1 that can be operated using a remote control (20).

5. Functional procedure of a pulling machine (1) for unloading and laying railway track according to claim 1 wherein said machine comprises a set of cameras located on the chasis characterised in that it comprises the following stages:

a) an operator climbs into the cab (9) of the pulling machine (1), starts the engine of the machine, and starts up a camera system;

b) the pulling machine (1) is positioned on a ballast platform (2) at the starting point of the section of track that is to be laid;

c) an operator standing trackside at the starting point of the section of track that is to be laid hooks each one of the groups of second tabs (17) that take part in the pulling slide (11) of the pulling machine (1), using shackles and cables; these rails (5) will be on the rail train that brought them;

d) the trackside operator takes a remote control (20) and verifies its functioning with a series of simple raising and lowering operations of the pulling slide (11) and making small lateral movements of the tube (15);

e) the operator in the cab (9) advances the pulling machine (1) aligning it with the sleepers (3) installed on the ballast platform (2); and f) the trackside operator walks close to the back of the pulling machine (1), which advances at a speed close to walking speed, providing a complete view of the rail-laying process, and controls the movement of the pulling slide (11) with the remote control (20).

* * * * *